Patented Nov. 9, 1926.

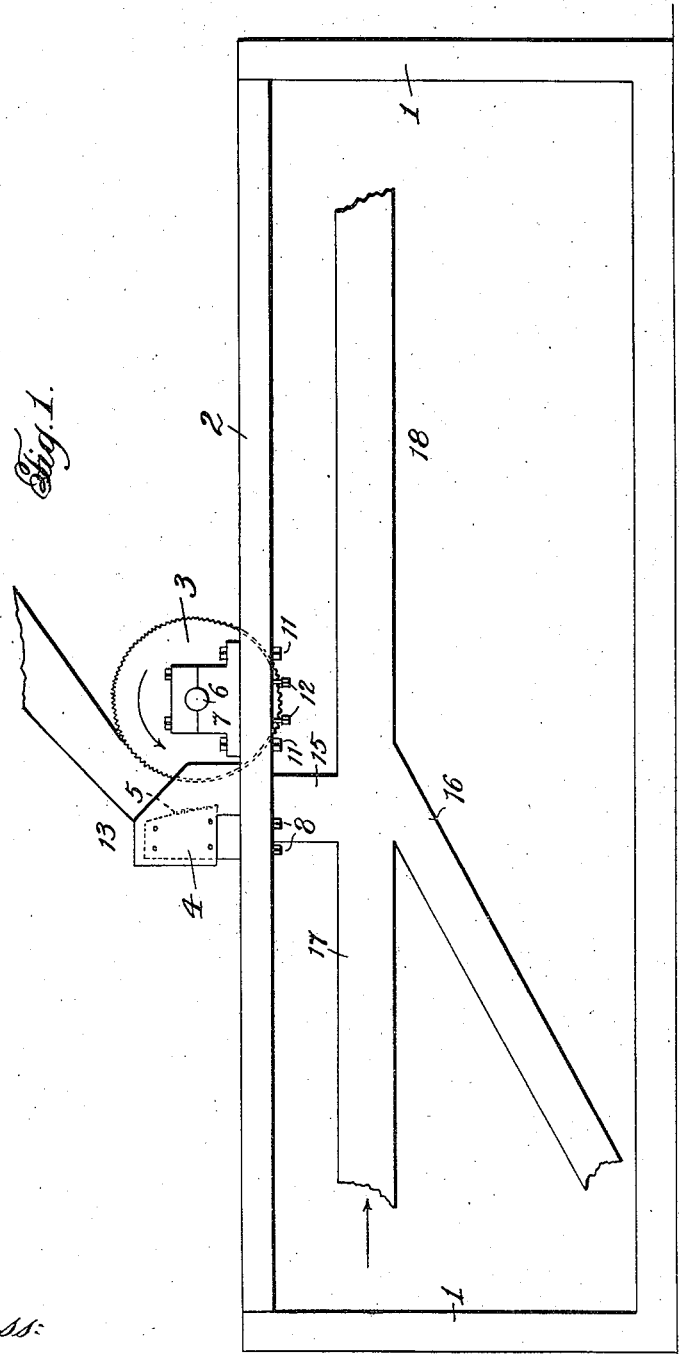

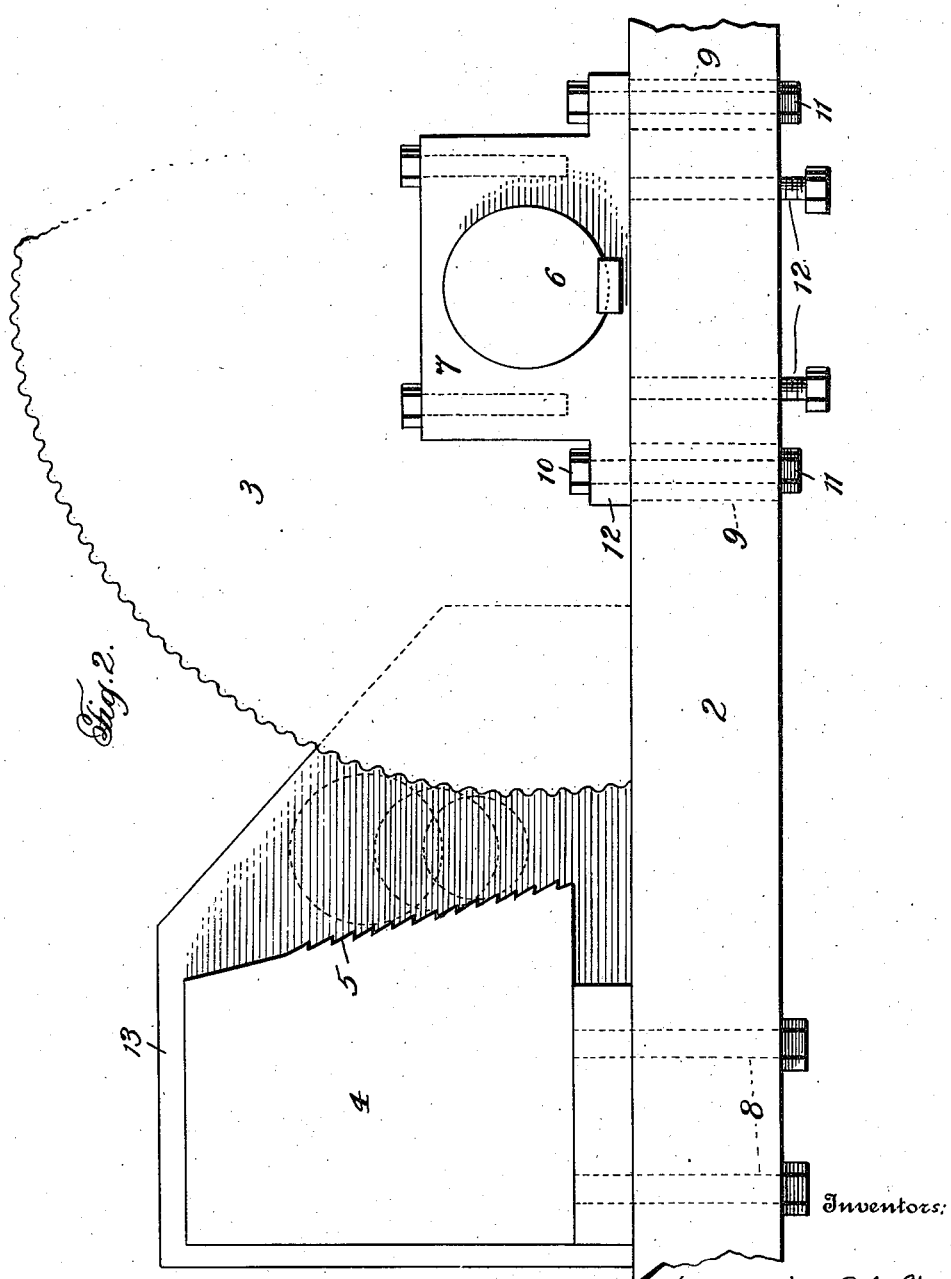

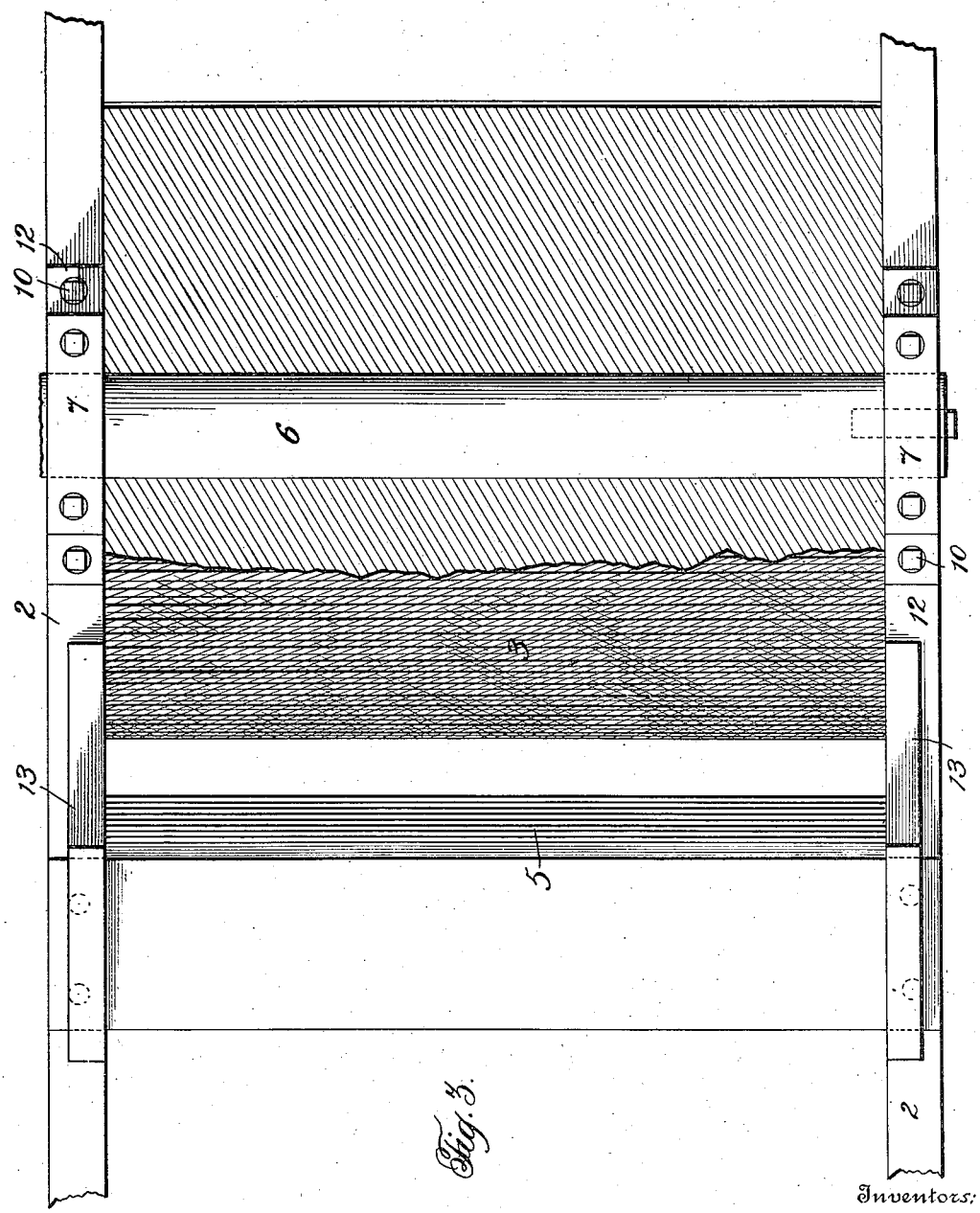

1,606,226

UNITED STATES PATENT OFFICE.

CHARLES A. HOPKINS, OF SAN FRANCISCO, CALIFORNIA, AND MILTON R. WOOD, OF SUGAR LAND, TEXAS, ASSIGNORS, BY DIRECT AND MESNE ASSIGNMENTS, TO TROPICAL PRODUCTS COMPANY, OF SAN FRANCISCO, CALIFORNIA, A CORPORATION OF CALIFORNIA.

MACHINE FOR CRACKING NUTS.

Original application filed July 6, 1923, Serial No. 649,968, and in Canada July 4, 1924. Divided and this application filed July 14, 1925. Serial No. 43,555.

This invention relates to an improved machine for cracking nuts, particularly nuts of the various species of the nut bearing palm trees, such as the "attila palm", "manaca palm", "coyol palm", and other palms of the same or similar families.

This application is a division of our application Serial No. 649,968, filed July 6, 1923.

The object of the invention is to provide an improved machine that will thoroughly and rapidly crack nuts of varying sizes and shapes and of different degrees of hardness of shell without injury to the kernels; an improved machine that will be capable of cracking nuts of varying sizes and shapes, and different degrees of hardness at the same time or operation without previous sorting or grading; that will apply the cracking force to the nuts to the best advantage to effect the cracking of the same with the minimum force or pressure required and without injury to the kernels, and to facilitate the separation of the kernels uninjured from the shells, to the end that the work of cracking and separation, is much simplified and more efficiently and expeditiously performed.

The invention, with other objects and advantages thereof, and the particular construction, combinations and arrangements of parts comprising the same, will be understood from the hereinafter contained detail description, when considered in connection with the accompanying drawings, forming part hereof, and illustrating one embodiment of the invention.

The invention comprehends cracking mechanism comprising a fixed cracking block or member provided with a sloping or inclined roughened surface, and a cooperating rotary roll member having a roughened surface, the cracking block or member being arranged to one side of the roll with its sloping roughened surface disposed opposite to an upper part of the rotary roll in spaced relation therewith and extending at an inclination toward the same, the sloping surface of the fixed block or member and the curvature of the opposing face of the roll providing a space therebetween which gradually decreases in width or tapers downwardly, said cracking mechanism being adapted to operate on nuts of varying sizes and shapes, and to apply a breaking force to the nuts below the central portion thereof, the operation being in the nature of a pinching action, and this pinching force being always exerted on the nuts below the central part thereof irrespective of the size and shape of the nuts, and when the breaking of the nuts takes place, under this pinching action, the broken nuts flying upwardly away from the roll and then falling by gravity between the fixed member or block and the roll.

In the drawings.

Figure 1 is a side elevation illustrating a machine constructed in accordance with the present invention.

Fig. 2 is a detail side elevation, on an enlarged scale, of the cracking mechanism unit having indicated therein diagrammatically nuts of varying sizes and the engagement of the same by the rotary roll and fixed block or member during the cracking operation.

Fig. 3 is a top plan view of the cracking mechanism unit.

While a specific embodiment of the invention is illustrated in the drawings, it will of course be understood that changes and obvious modifications of the particular construction, combinations, and arrangements of parts shown, and the embodiment of the invention in other forms, as will appeal to those skilled in the art and falling within the scope of the appended claims, may be practiced without departing from the spirit of the invention.

Referring to a detail description of the particular embodiment of the invention illustrated in the drawings, the supporting frame of the machine, which may be of any suitable construction, is here shown as comprising vertical standards or bars 1 and a pair of spaced horizontally extending bars 2. 3 designates the rotary roll member, and 4 the fixed incline of the cracking unit, the latter preferably, as shown, being in the form of a solid block or anvil having a face 5 at one side extending in an inclined plane. The rotary roll 3 is supported horizontally, the same having journals 6 at its ends supported in bearings 7 on the horizontal bars 2 of the frame. The fixed incline or block 4 is shown mounted on the bars 2 at one side of the rotary roll 3 with its inclined face 5 disposed opposite to the upper half of the cracking roll 3 in spaced relation therewith and extending downwardly toward the same, the sloping face 5 of the block or fixed member 4 and the curvature of the opposing face of the roll member 3 providing a space therebetween which gradually decreases in width or tapers downwardly from the upper entrance end of the unit. The block or fixed member 4 is firmly secured to the bars 2 by bolts 8 or equivalent fastening means. Means is provided for adjusting one of the cracking elements toward and from the other to vary the spacing thereof. For this purpose the bars 2 are provided, as shown, with elongated openings 9, and the bearings 7 of the roll 3 are clamped to the bars 2 by bolts and nuts 10, 11, the bolts 10 extending through apertured flanges 12 of the bearings 7 and the elongated openings 9 in the bars 2. 12 designates pairs of adjusting screws, each having a threaded engagement with one of the bars 2 and extending forwardly therethrough and engaging the bottom face of one of the bearings 7. By loosening the nuts 11 the bearings 7 may be shifted horizontally on the bars 2, and they may be adjusted vertically through the medium of the adjusting screws 12. The inclined face of the fixed block or member 4 is roughened and the roll member 3 is also provided with a roughened outer face. Both the fixed member or block 4 and the rotary roll member 3 are preferably constructed of steel, or other suitable metal, and serrated to provide file like roughened surfaces throughout the inclined face 5 of the fixed member or block 4 and the outer face of the rotary roll 3. The roughened face 5 of the fixed block or member 4 is preferably formed, as shown, of rows of fine teeth that are triangular shape in cross section, having downwardly inclined faces 5ª and adjoining abruptly extending bottom faces 5ᵇ. The outer face of the rotary roll 3 is shown provided with series of small longitudinal corrugations or ribs 3ª extending throughout the same, the faces of said ribs 3ª and the face portions therebetween being finely serrated. 13 designates plates suitably secured to the ends of the fixed member or block 4 and extending forwardly therefrom in overlapping relation with the ends of the rotary roll member 3 to prevent the nuts from escaping at the ends of the unit from between the cracking elements. Any suitable means, not shown, is employed for driving the rotary roll member 3. 14 designates a portion of a feed chute leading to the nut cracking unit.

The nut cracking mechanism hereinbefore set forth is adapted to operate on nuts of the nature referred to, after the husks have been removed therefrom. In the operation of the nut cracking mechanism, the rotary roll member 3 is rapidly rotated, and as the nuts are fed to the mechanism through the chute 14, they are gradually drawn into the downwardly tapering space between the fixed incline and the rotary roll member until a point is reached depending upon the size and shape of the nut, where a pinching pressure is applied to the nut below the central part thereof to break the same, the fine file like teeth of the roughened surface of the incline and the corrugated roughened surface of the rotary roll member 3 acting to grip and hold the nuts against slipping from the incline and roll member during the breaking operation. As the shells of the nuts break under this pinching action applied below the central part of the nut, the broken nut is caused to fly upwardly from the roll and incline, and then drops back by gravity and falls between the incline and roll member and is discharged therefrom. As the broken nuts are caused to fly upwardly as the result of the breaking operation, this tends to separate the broken parts of the nuts from each other. The diameters of any parts of the broken nuts will be less than the distance between the lower end of the fixed block or member 4 and the rotary roll member 3 so that the cracked nuts readily find a passage between the fixed member or block and the rotary roll member, and are discharged therefrom without injury to the kernels.

Any suitable means may be employed for separating the shells from the kernels. In the particular construction shown in the drawings, 15, 16, designate discharge chute portions leading from the cracking mechanism. 17 is a horizontally extending casing or passage communicating at one end with the discharge portion 15 at one side thereof, and 18 is a horizontally extending discharge chute portion having its inner end disposed opposite to the inner end of the horizontal casing part 17 and communicating with the discharge chute portion 15. Suitable air forcing means (not shown) is connected to the horizontally extending casings or passages 17, 18, to provide a blast of air therethrough in the direction of the arrow. As the broken nuts are discharged through the chute portion 15, they are subjected to the air blast from the horizontal casing portion or passage 17, the kernels of the nuts being blown off through the horizontally extending discharge chute portion 18 while the heavier shell portions pass downwardly through the discharge chute portion 16.

By the special mechanism hereinbefore described, a machine is provided that will effectually crack palm nuts of the character referred to of various sizes and shapes and of different degrees of hardness at the same operation without injury to the kernels, the necessity for previous sorting and grading of the nuts and machines and work incidental to this preliminary sorting and grading being entirely avoided so that the work of cracking is much simplified and can be carried on much more rapidly, and at considerably less expense. It will also be observed that the particular cracking mechanism functions to apply the breaking force to the nuts in such a manner that the cracking is effected with the minimum pressure required and without injury to the kernels, the breaking force being always exerted on the nuts below the central parts thereof, irrespective of the size and shape thereof, the breaking operation being in the nature of a pinching action as distinguished from an impact or crushing action as in machines heretofore employed for this purpose.

What we claim is:

1. In a machine of the class described, nut cracking mechanism comprising a wide non-yieldable rotary roll member having a roughened surface and a cooperating wide fixed member having a roughened surface spaced from the face of the roll member, the members being of sufficient width to operate simultaneously on a plurality of nuts, and the fixed member being disposed opposite the portion of the roll member lying above the axis thereof so that a downwardly tapering wide cracking zone terminating substantially in the horizontal plane of said axis is provided between the roll member and the fixed member.

2. Nut cracking mechanism comprising a rotary roll member provided with a roughened outer face and a cooperating rigidly held anvil member having a roughened face extending in a plane, the anvil member being arranged with its roughened face disposed opposite an upper portion of the rotary roll member and terminating at its lower end adjacent the horizontal plane of the axis of the rotary roll member to provide a downwardly tapering cracking zone between the anvil member and the roll member, and providing for gripping and exerting a pinching breaking pressure on different size nuts below the central portion thereof.

3. In a machine of the class described, nut cracking mechanism comprising a rotary cylindrical roll member having a longitudinally ribbed outer face, and a rigidly held anvil member having a roughened face extending in a plane, said anvil member being arranged with its roughened face disposed opposite to an upper part of the rotary roll member so that a downwardly tapering cracking zone is provided between the anvil member and the roll member, said mechanism being adapted to grip and exert a pinching breaking pressure on different size nuts below the central portion thereof.

4. In a machine of the class described, nut cracking mechanism comprising a rotary roll member provided with a roughened outer face, and a cooperating rigidly held anvil member having a face extending in a plane and provided with closely associated teeth having upper downwardly inclined face portions, and adjoining abruptly extending bottom face portions, said anvil member being arranged opposite an upper portion of the roll member to provide a downwardly tapering cracking zone between the anvil member and the roll member, said mechanism being adapted to grip and exert a pinching breaking pressure on different size nuts below the central portion thereof.

5. Nut cracking mechanism comprising a rotary cylindrical roll member having a longitudinally ribbed outer face and a cooperating rigidly held anvil member having a face extending in a plane and provided with series of teeth having upper downwardly inclined face portions, and adjoining abruptly extending bottom face portions, said anvil member being arranged with its toothed face disposed opposite to an upper part of the rotary roll member to provide a downwardly tapering cracking zone between the anvil member and the roll member, said mechanism being adapted to grip and exert a pinching breaking pressure on different size nuts below the central portion thereof.

6. In a machine of the class described, nut cracking mechanism comprising a rotary cylindrical roll member provided with a roughened outer face, and a rigidly held anvil member having a roughened face extending in a plane, said anvil member being arranged with its roughened face disposed at an inclination opposite to an upper part of the rotary roll member to provide a downwardly tapering cracking zone between the anvil member and the roll member, said mechanism being adapted to grip and exert a pinching breaking pressure on different size nuts below the central portion thereof.

7. A machine in accordance with claim 1 in which the roll member rotates about a horizontal axis towards the roughened surface of the fixed member, and in which means is provided for the adjustment of the fixed member relatively to the roll member.

In testimony whereof we hereunto affix our signatures.

CHARLES A. HOPKINS.
MILTON R. WOOD.